United States Patent [19]
Holliday

[11] Patent Number: 6,125,874
[45] Date of Patent: Oct. 3, 2000

[54] GATE VALVE HAVING FAIL SAFE ACTUATOR

[75] Inventor: David G. Holliday, Spring, Tex.

[73] Assignee: Dril-Quip, Inc, Houston, Tex.

[21] Appl. No.: 09/336,928

[22] Filed: Jun. 21, 1999

[51] Int. Cl.⁷ .................................................. F16K 17/36
[52] U.S. Cl. .......................... 137/81.2; 251/327; 251/282; 251/63.6; 251/63.5
[58] Field of Search .............................. 251/63.5, 63.6, 251/282, 327; 137/81.2

[56] References Cited

U.S. PATENT DOCUMENTS

| | | | |
|---|---|---|---|
| Re. 30,115 | 10/1979 | Herd et al. | 137/236 |
| 2,885,172 | 5/1959 | Natho | 251/14 |
| 2,974,677 | 3/1961 | Natho | 137/456 |
| 3,765,642 | 10/1973 | Nelson | 251/14 |
| 3,770,247 | 11/1973 | Nelson | 251/282 |
| 3,933,338 | 1/1976 | Herd et al. | 251/63.6 |
| 4,029,294 | 6/1977 | McCaskill et al. | 251/326 |
| 4,135,546 | 1/1979 | Morrison | 251/63.6 |
| 4,230,299 | 10/1980 | Pierce, Jr. | 137/315 |
| 4,294,284 | 10/1981 | Herd | 137/236 |
| 4,311,297 | 1/1982 | Barrington | 251/63.6 |
| 4,436,279 | 3/1984 | Bonds et al. | 251/86 |
| 4,489,756 | 12/1984 | Balz | 137/625.33 |
| 4,585,207 | 4/1986 | Shelton | 251/62 |
| 4,809,733 | 3/1989 | Hawkins | 137/236.1 |
| 4,871,143 | 10/1989 | Baker | 251/58 |
| 4,925,154 | 5/1990 | Baker | 251/58 |
| 4,934,652 | 6/1990 | Golden | 251/63.6 |

OTHER PUBLICATIONS

McEvoy Brochure entitled The McEvoy Automatic Sealing System; pp. 2–3.
McEvoy Brochure entitled Subsea Stack Valves; pp. 4086–4087.
McEvoy Brochure entitled Patented* McEvoy Valves Solve Unique Operating Problems In Deep and Very Deep Water (2 pages).

*Primary Examiner*—A. Michael Chambers
*Assistant Examiner*—Thomas L. McShane
*Attorney, Agent, or Firm*—Browning Bushman

[57] ABSTRACT

There are disclosed three embodiments of a gate valve having a fail safe actuator which is especially useful in a subsea environment at considerably depth below water surface. The gate is urged to open position by control pressure and is moved to closed position, upon loss of a controlled condition, by means of a spring acting between the actuator and the stem. In one embodiment, when the body pressure is low, a floating ring sealably shiftable within an annular space between the stem and actuator is urged by body pressure into a position to engage a stop on the stem, and thus provide a force urging it in a direction to close the gate, when body pressure is below ambient, and by ambient pressure to a position to engage a stop on the actuator when body pressure is above ambient. In a second embodiment of the invention, the valve includes a balance stem which is spring-pressed to engage the end of the gate opposite its operating stem, when body pressure is low relative to ambient, but moves out of engagement with gate and into a limited position in engagement with the actuator, when body pressure is high relative to ambient. In the third embodiment of the invention, the valve includes both the floating ring and the spring-pressed balance stem of the first and second embodiments.

7 Claims, 13 Drawing Sheets

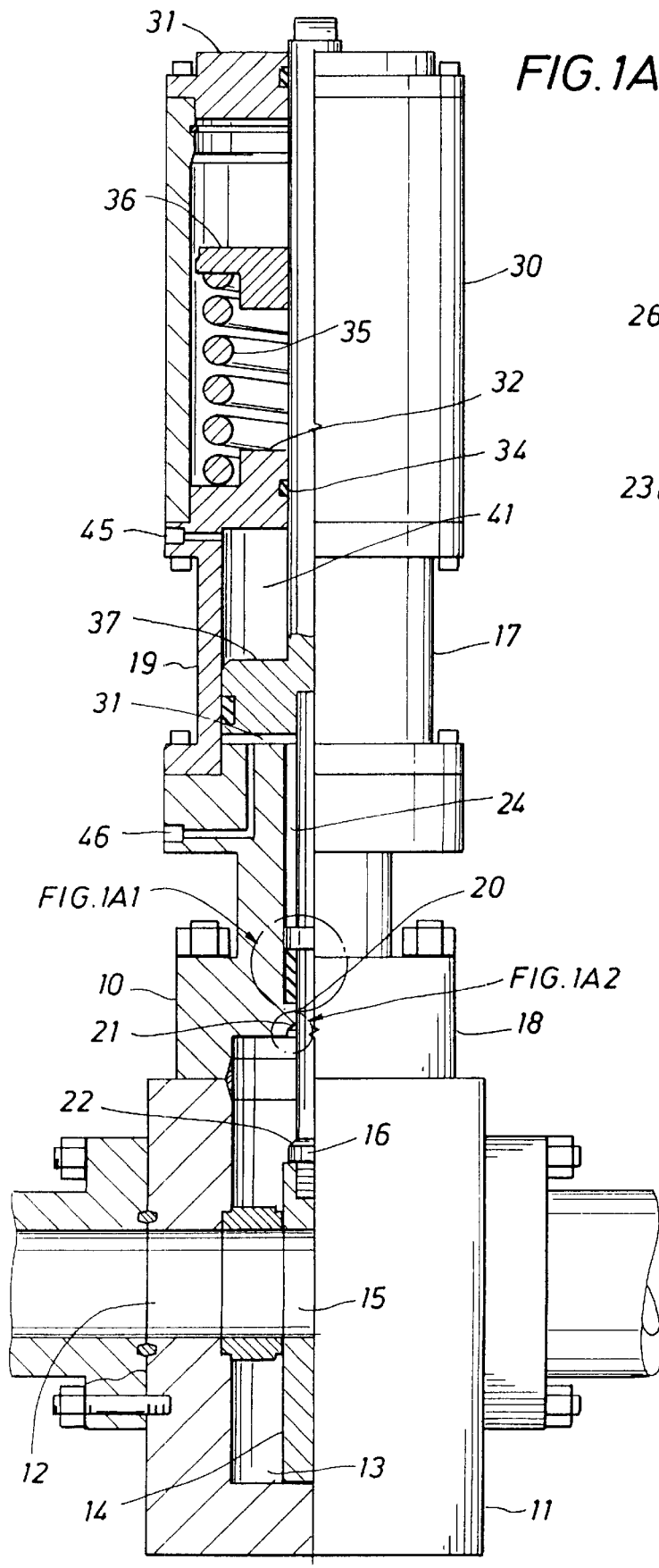
FIG.1A
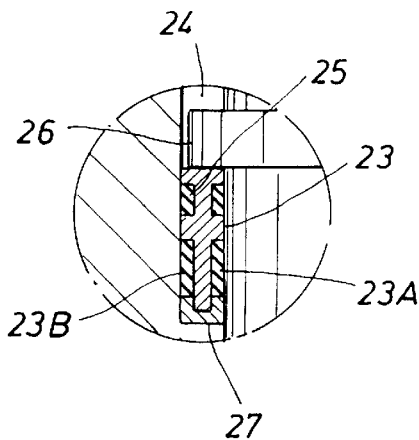
FIG.1A1
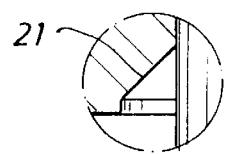
FIG.1A2

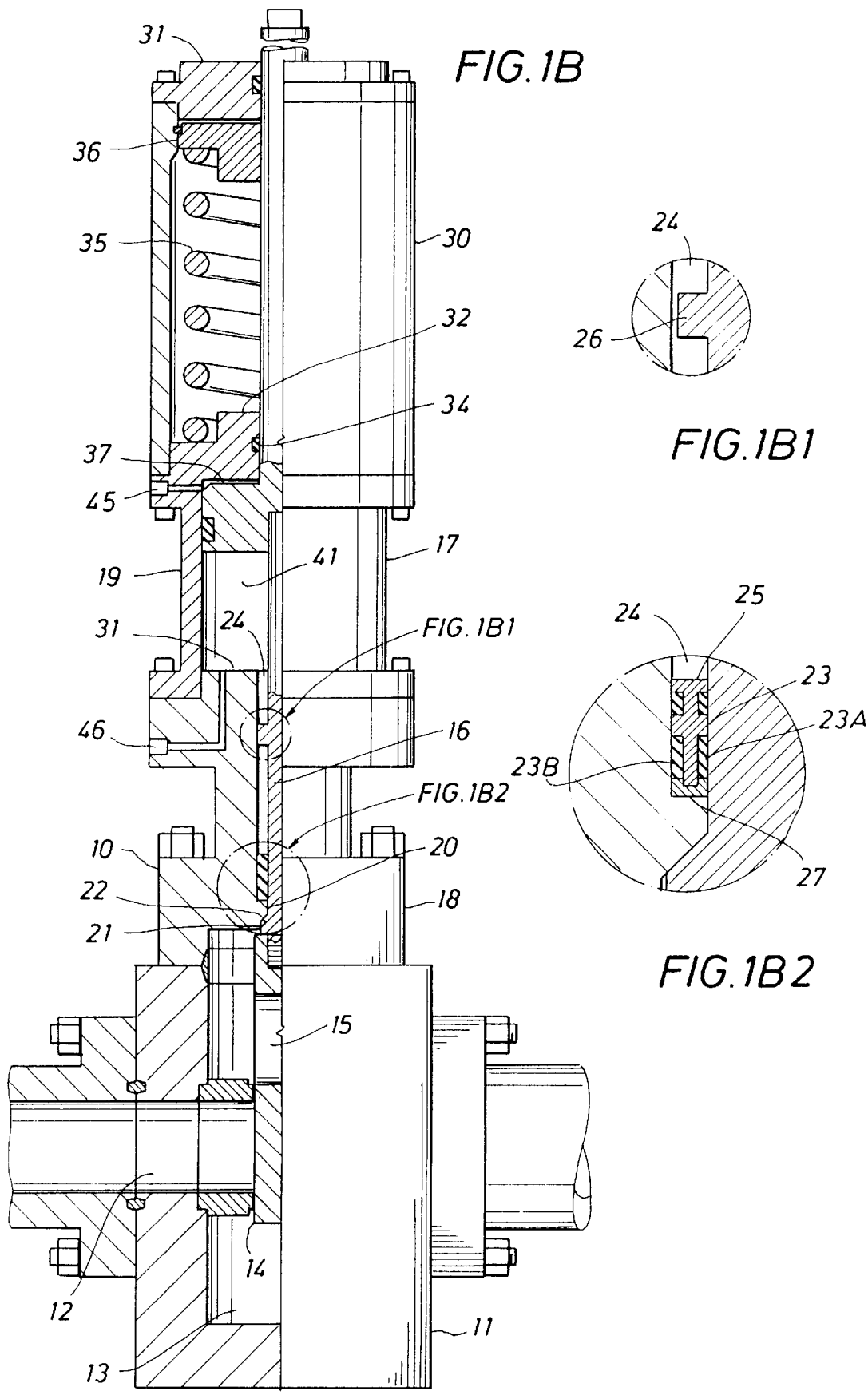

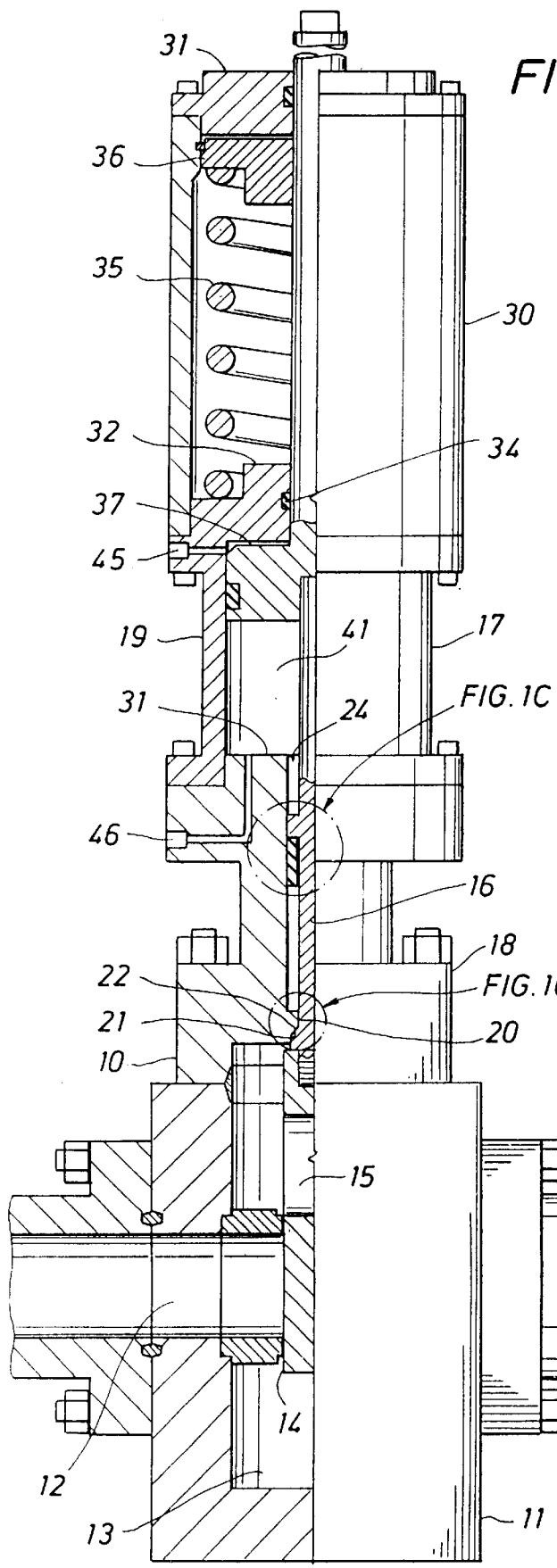
FIG.1C
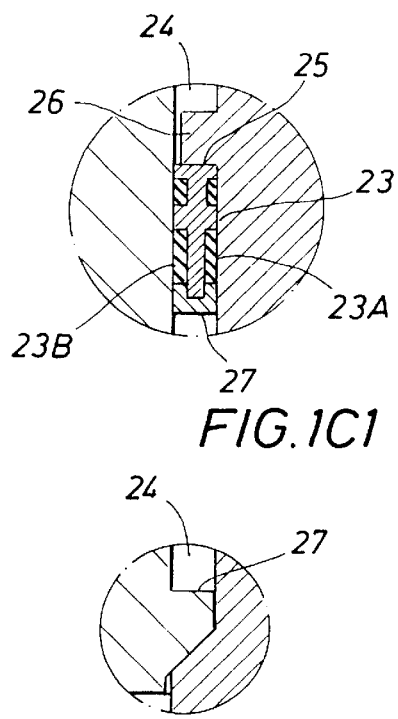
FIG.1C1
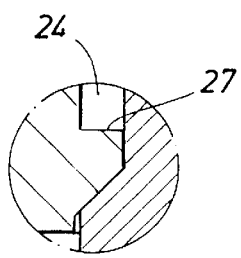
FIG.1C2

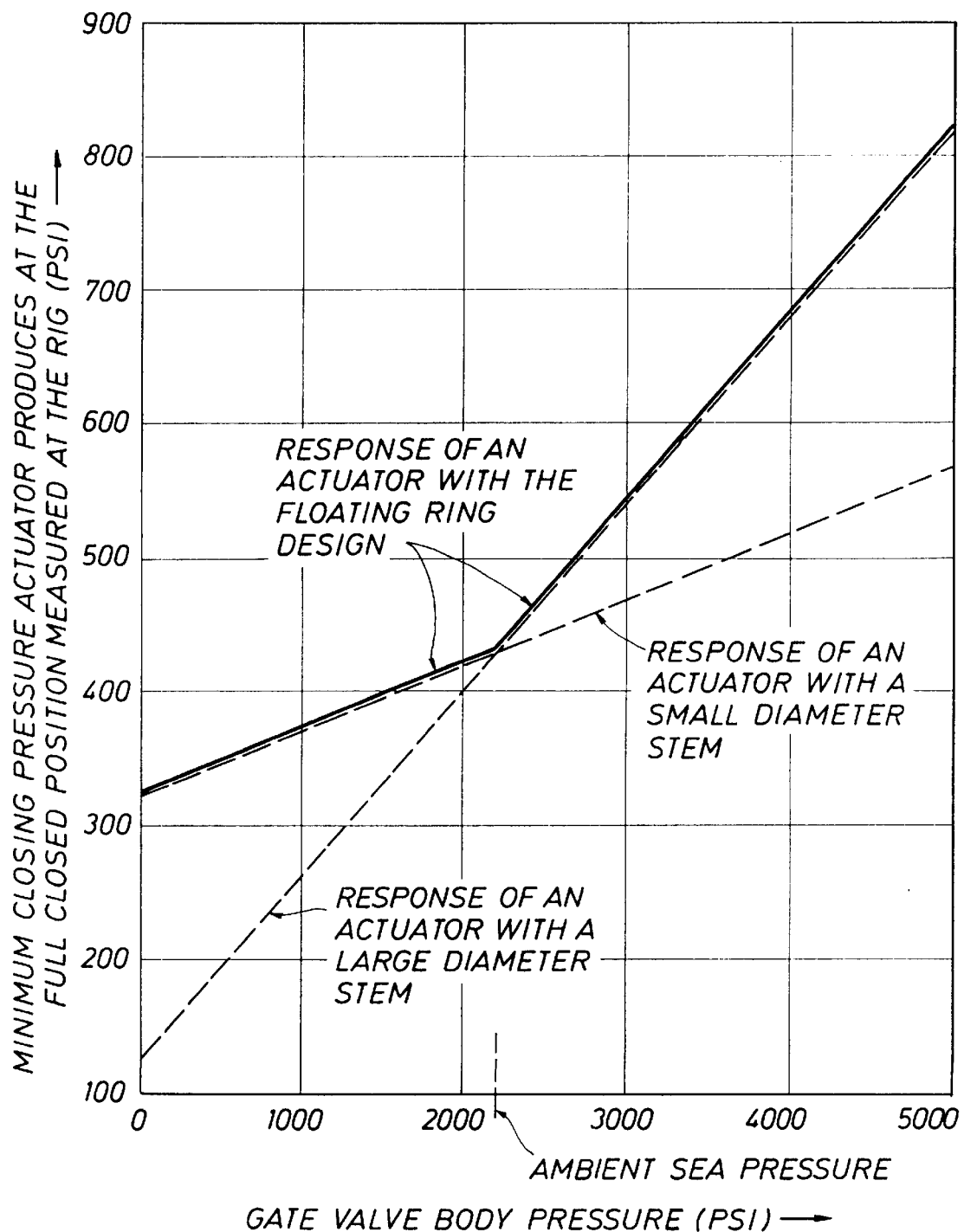

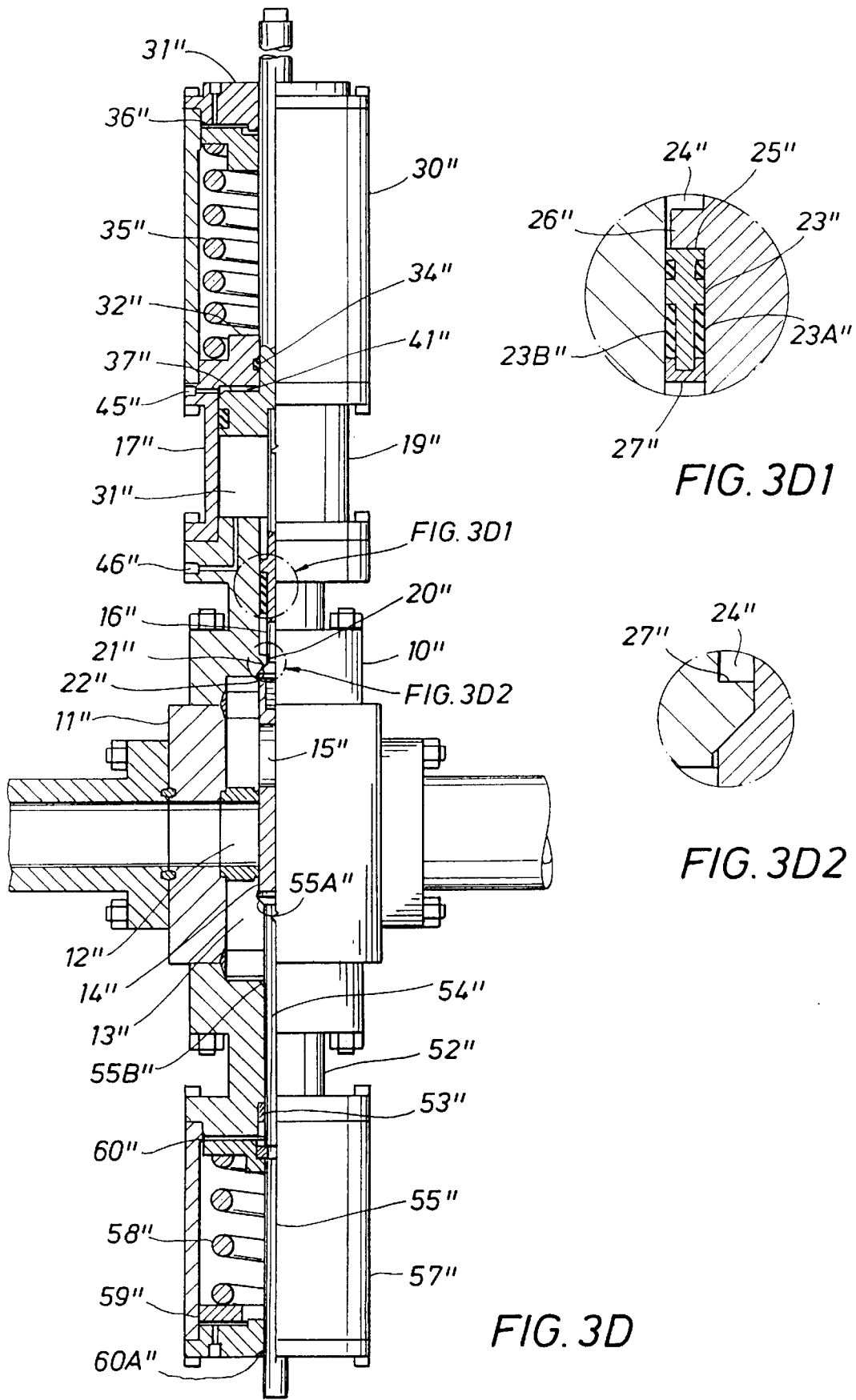

GATE VALVE HAVING FAIL SAFE ACTUATOR

BACKGROUND OF THE INVENTION

This invention relates generally to a gate valve having a fail safe actuator. More particularly, it relates to a gate valve of this type which is especially useful in a subsea environment at considerable depth below the water surface.

In a typical fail safe valve, a spring acts between the valve stem and an actuator mounted on the body of the valve in which the gate reciprocates to urge the gate to one position, which may be closed, and control fluid is applied to a piston on the stem reciprocable within a pressure chamber in the actuator to overcome the force of the spring and thereby maintain the valve in its other position, usually open, so long as a controlled condition is maintained. If, however, the condition "fails", the control pressure is exhausted to permit the spring to move the gate to its closed position. Typically, the condition being controlled may be pressure within the line in which the valve is installed, or another pressure condition at a location remote from the valve.

In the event the body pressure is significantly greater than ambient sea pressure, it provides a net outward force on the stem to move the gate to its failed position upon exhaustion of control pressure. In this situation, the spring may not even be needed as long as the net force due to body pressure acting on the stem is sufficient to overcome the above described forces. If, however, body pressure is less than, or even approximately the same as, ambient sea pressure, the spring is required.

When the valve is disposed in subsea environments, combined forces due to the ambient sea pressure at the subsurface level and the static control fluid head pressure urges the stem piston inwardly, and thus the gate to its controlled position with substantial force. Hence, in order for the valve to move its failed position, upon the exhaust of control pressure, the force due to the spring and that due to body pressure acting on the stem must be great enough to overcome the force on the stem due to ambient sea pressure, the force on the piston due to the control fluid's hydrostatic head pressure, plus any friction forces.

Thus, when a valve of this construction is disposed at great depth, and body pressure drops significantly below the ambient sea pressure, the spring must be large enough to close the valve as the force due to body pressure acting on the stem will not be sufficient to move the gate to its failed position. The extreme condition could occur, for example, when the valve is used in a "block and bleed" environment where the body pressure goes to zero. In this situation, a small diameter stem is preferred in order to decrease the net force on the stem, thereby reducing the size of the actuator and/or increasing the depth rating of the valve. Conversely, when the body pressure is significantly above the ambient sea pressure, a large diameter stem is desired.

The object of this invention is to provide a valve of this type which is of such construction as to move to failed position under either condition, i.e., regardless of which pressure is significantly greater, while also minimizing the size of the actuator.

This and other objects are accomplished, in accordance with the illustrated embodiment of the invention, by a fail safe valve which includes, as in conventional valves of this type, a valve body having a flowway therethrough and a cavity intersecting the flowway, a gate reciprocable within the cavity between positions to open and close the flowway, and an actuator for moving the gate between such positions.

As is also the case in valves of this type, the actuator comprises a bonnet mounted on the valve body and a stem connected to the gate and extending sealably out one end of the bonnet and having a piston sealably slidable within the bonnet to form a pressure chamber on one side thereof, whereby control fluid may be supplied thereto so as to move the gate to and hold it in one position, usually open, as long as the controlled position is maintained. Spring means acting between the actuator and stem as well as ambient pressure acting on the other side of the piston urge the gate toward its other closed or failed position, so that, upon the exhaust of control pressure in response to loss of that condition, the gate is moved to its one or open position.

In accordance with one illustrated embodiment of the invention, a floating ring is sealably reciprocable within an annular space between the bonnet and stem between one limited position engaged with a stop on the bonnet, when the body pressure is below a predetermined level, and an opposite limited position engaged with a stop on the stem, when body pressure is above said level. Thus, where the pressure in the body significantly exceeds the ambient sea pressure, and the ring is caused to bottom out against the shoulder on the stem due to the upward force produced by the pressure differential across it, the stem and ring behave like a large diameter stem. On the other hand, when the body pressure in the gate valve is significantly less than the ambient sea pressure, the stem and ring behave like a small diameter stem in that the ring will be pushed down against the stop on the bonnet due to the pressure differential in the downward direction, whereby the effective cross sectional area of the stem is only from the small stem diameter that contacts the inside diameter of the floating ring. Thus the opposing force that the actuator spring must overcome in order to close the gate valve is reduced since the force produced by the sea pressure acting on the floating ring is carried by the bonnet.

In accordance with a second illustrated embodiment of the invention, a balance stem extends sealably out a lower housing or the opposite end of the main housing of the actuator for reciprocation between an inner position engaged with gate opposite the operating stem and a limited outer position engaged with the lower housing, together with spring means acting between the balance stem and lower housing to urge the balance stem toward engagement with the end of the gate. This also has the effect of a large stem when the gate valve body pressure is substantially higher then the ambient sea pressure. On the other hand, when the body pressure is not substantially higher than the ambient sea pressure, this design can give the net effect of a small diameter stem, a zero diameter stem or even a negative diameter stem as the spring means on the balance stem is designed to have a substantial effect on the balance stem.

This design differs from prior designs wherein a spring means acting on a detached balance stem has been used only to overcome frictional drag forces from seals in the bore, and instead provides much higher force on the balance stem and thus allows operation at greater depths. Prior designs of balance stems also rely on downstream bore pressure acting directly on the spring means of the balance stem. The present invention eliminates the need of such downstream pressure assistance by providing spring means of such design that its effect on the detached stem substantially modifies the effects of the ambient sea pressure.

When closing the gate valve, where the body pressure in the gate valve is significantly greater than the ambient sea pressure, the gate valve functions like a regular gate valve that has no balance stem in that the balance stem will simply move out until it engages the stop on the valve body. However, when the pressure inside the valve acting on the balance stem is less than the combined forces of the ambient sea pressure acting on the outer end of the balance stem and the spring force, the detached balance stem is raised to bear against the bottom of the gate with a force produced by the balance stem spring and the differential pressure acting on the balance stem.

In the case where the spring energized detached balance stem is used with an existing subsea actuator, the force produced by the actuator, as the valve is closed, would increase significantly to allow this actuator to be used in deeper water. Present uses of a spring energized detached balance stem do not allow for the use in deeper water due to the spring being designed merely to overcome frictional drag forces.

As an alternative option to increasing the actuator's closing pressure, the minimum closing pressure can be kept about the same and the actuator's main spring size can be decreased. Yet another option is to size the balance stem spring and the main actuator spring to act independently to close the gate valve, regardless of the bore pressure, and without help from the other spring. This is a significant feature because, if the actuator spring breaks in a standard subsea actuator, the valve will not fully close when there is low body pressure in the gate valve.

In accordance with a third illustrated embodiment of the invention, both the first and second embodiments are combined. Thus, a floating ring is sealably reciprocable within an annular space between the bonnet and stem between one limited position engaged with a stop on the bonnet and an opposite limited position engaged with a stop on the stem, a balance stem extends sealably out of the lower bonnet on the other end of the main housing for reciprocation between an inner position engaged with the gate and a limited outer position engaged with the lower bonnet, and spring means acts between the balance stem and lower bonnet to urge it toward engagement with the gate. This then has the advantages of both the first and second embodiments as well as the ability to produce a greater closing pressure when the body pressure its lower.

As illustrated, the valve of the present invention is of the fail closed type wherein the gate is held in open position as long as control pressure is maintained, and moved to closed position when the controlled condition fails.

In the drawings, wherein like reference characters are used throughout to designate like parts:

FIG. 1A is a side view of a gate valve, partly in section and partly in elevation, constructed in accordance with the first described embodiment of the invention, and showing the gate in its controlled, open position;

FIG. 1B is a view similar to FIG. 1A, but upon failure of the controlled condition to permit the valve to be closed, and showing the floating seal ring between the stem and actuator housing in its lower position engaged with the stop on the housing;

FIG. 1C is a view similar to FIG. 1B, but wherein the floating seal ring has moved to its upper position engaged with stop on the stem;

FIG. 1D is a graph illustrating the effect of this design on the operation of the valve when compared to the response of a large and small diameter stem designs;

Figure 2A:
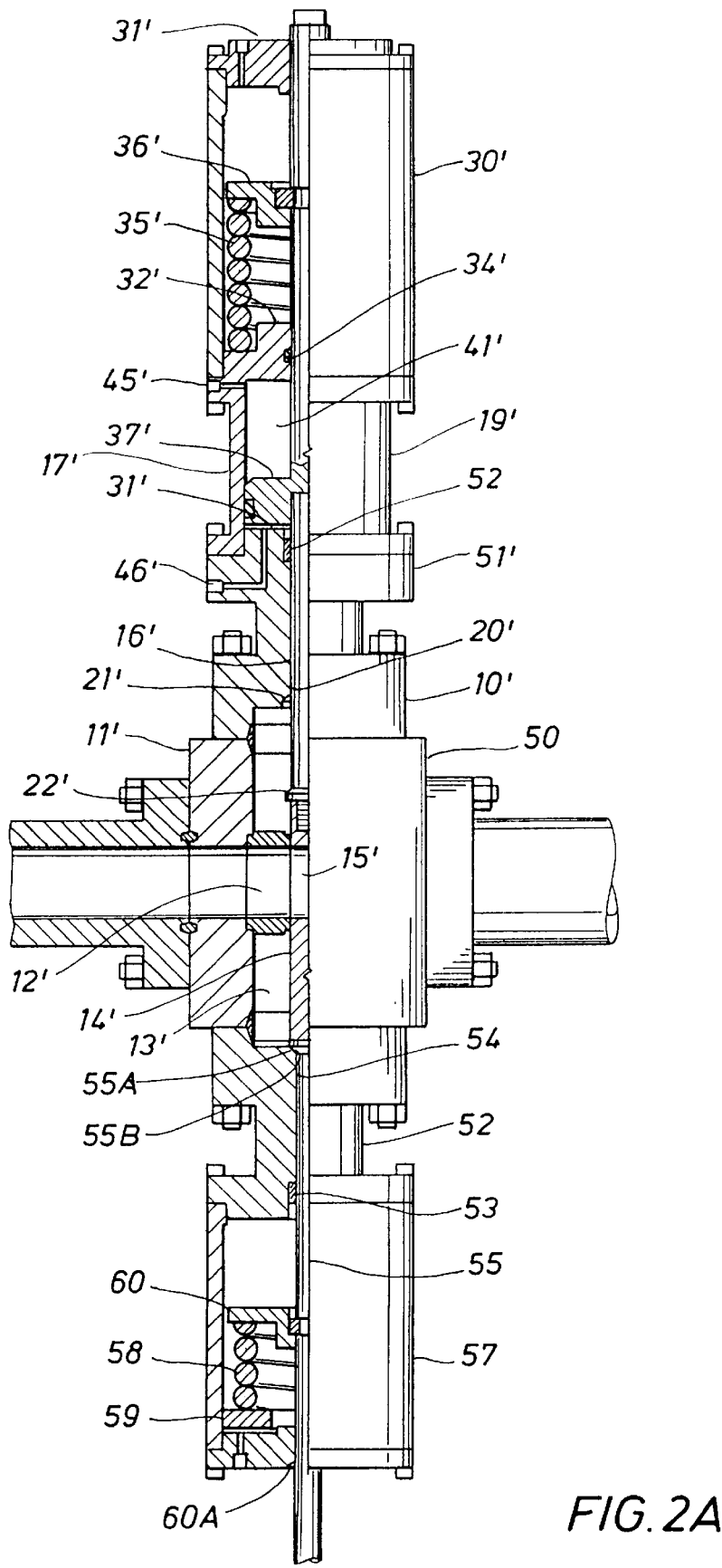
Figure 2B:
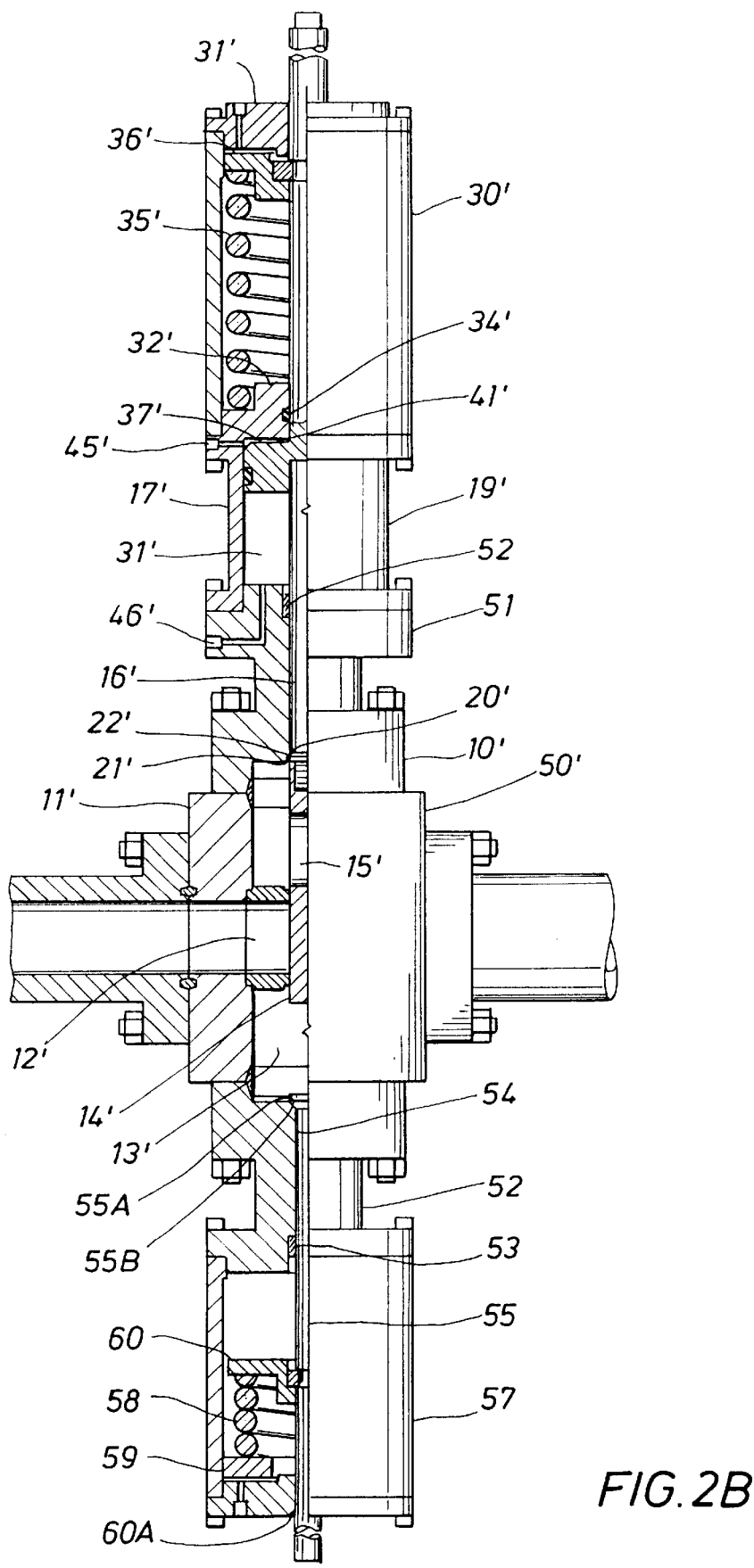
Figure 2C:
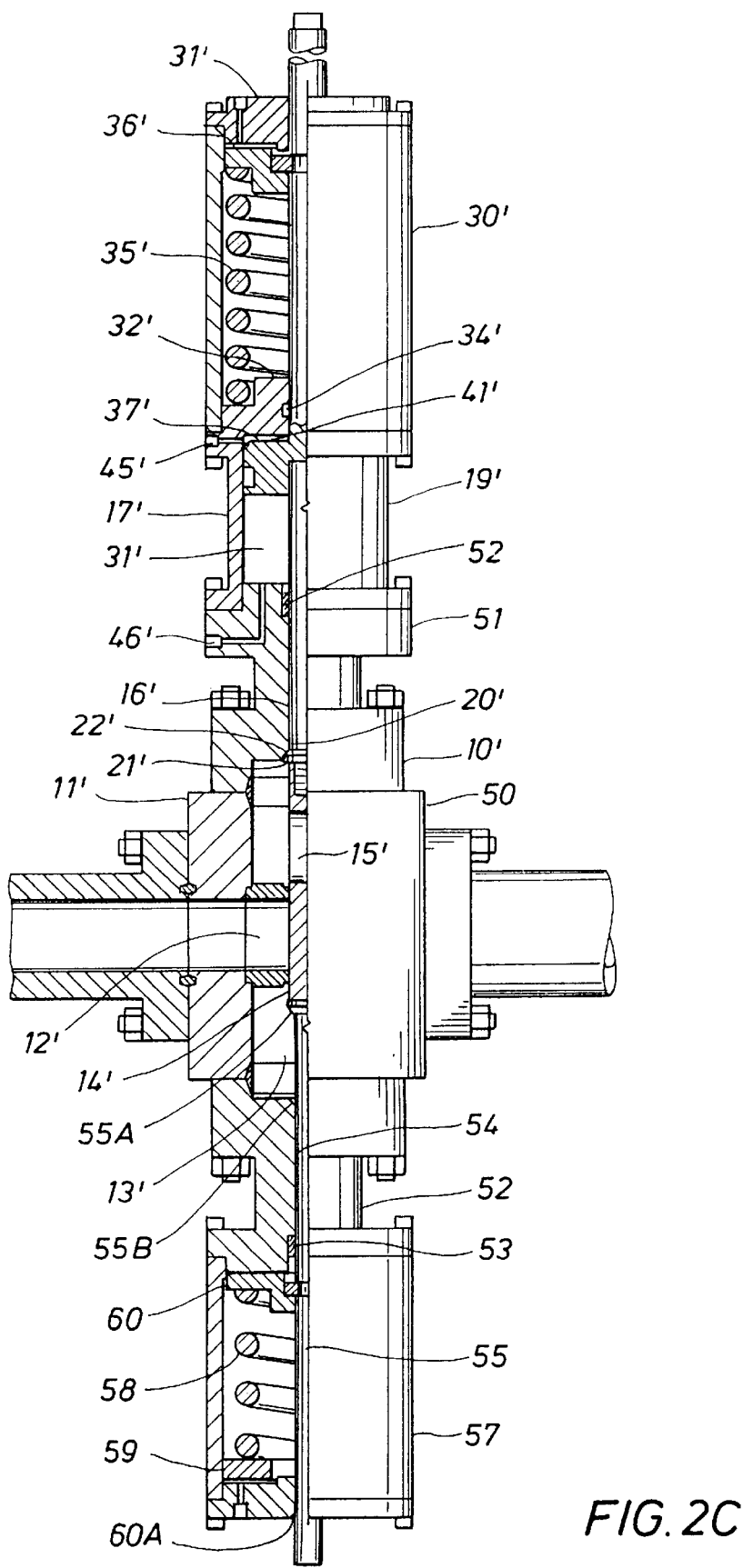
Figure 2D:
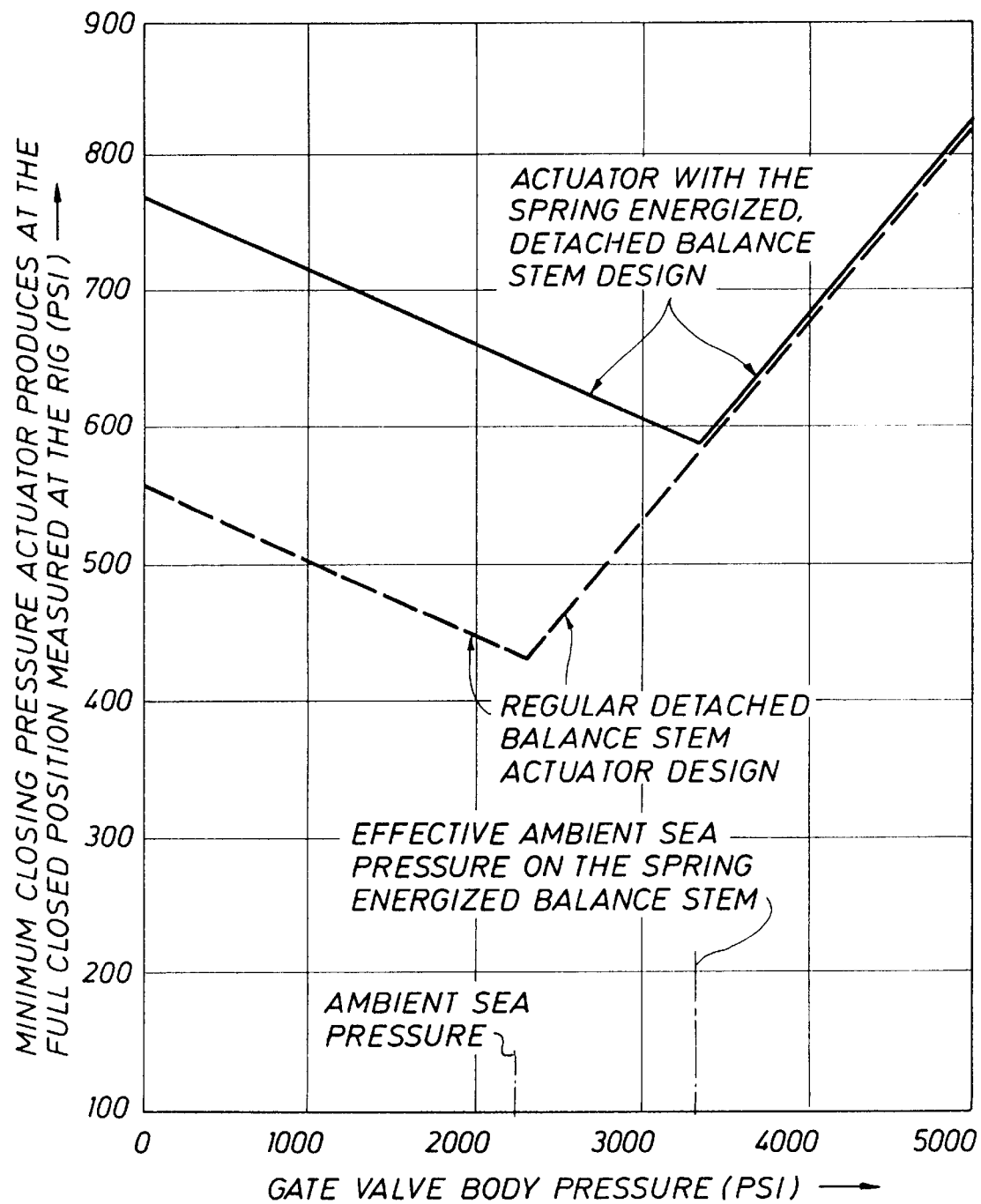
Figure 3A:
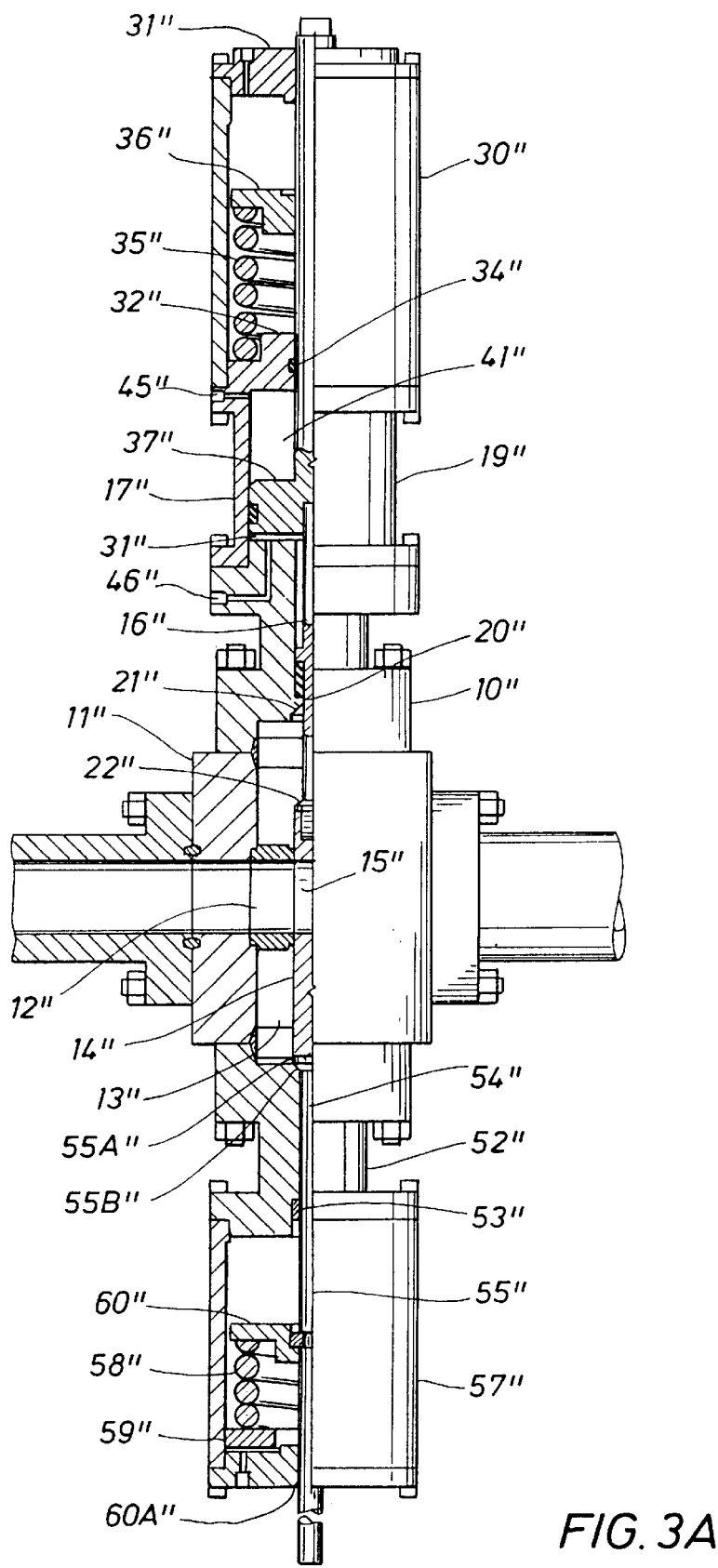
Figure 3B:
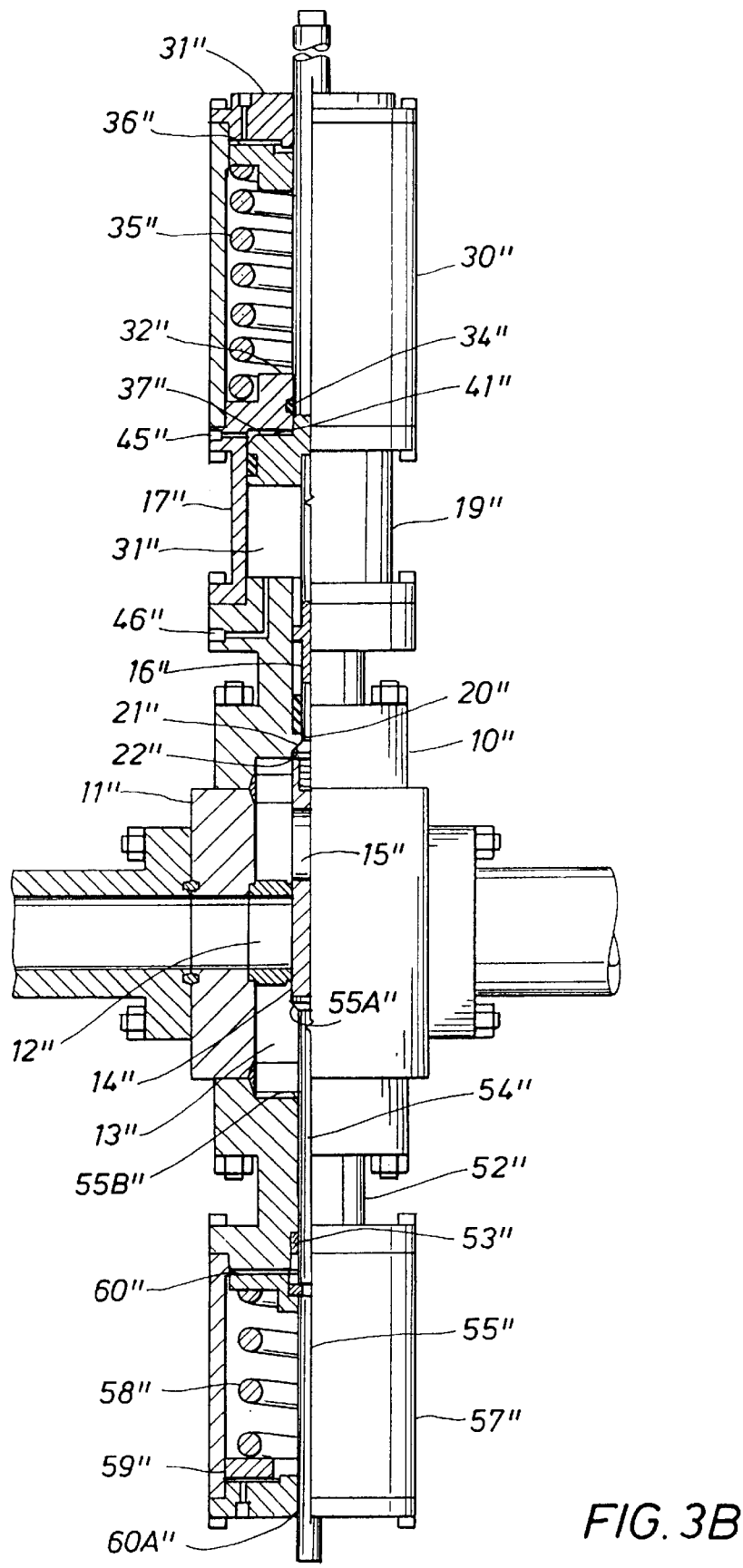
Figure 3C:
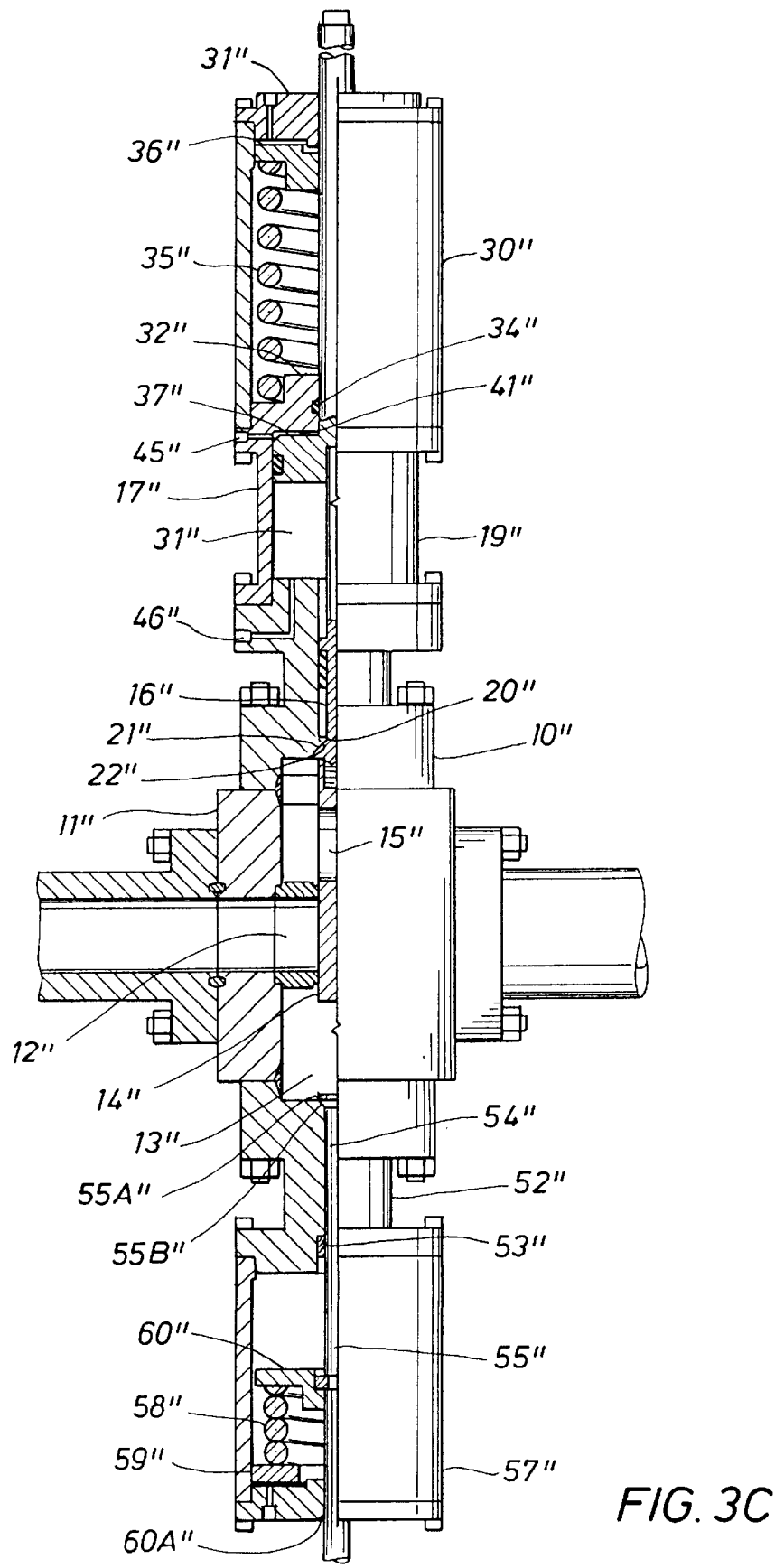
Figure 3E:
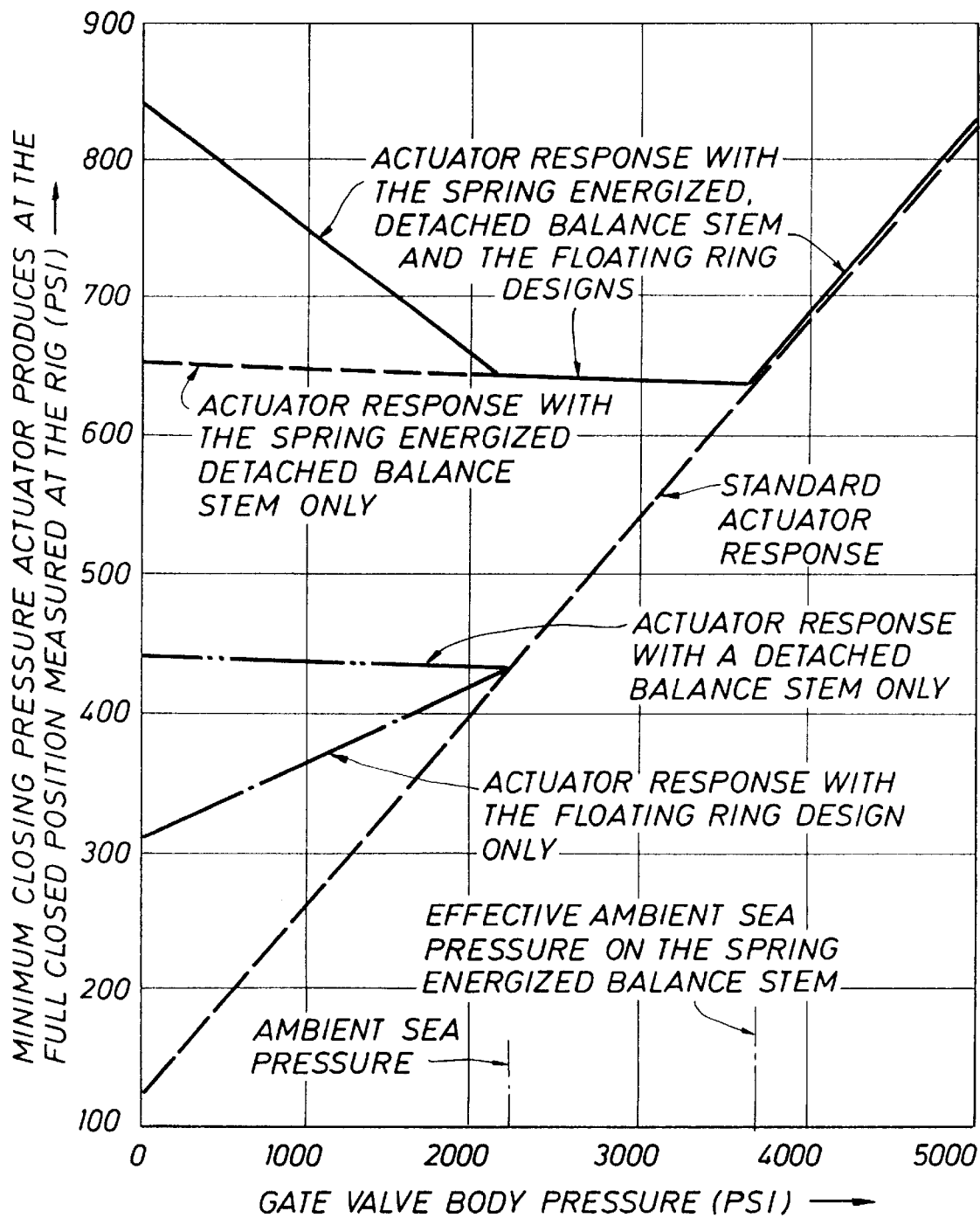

FIGS. 1A1 and 1A2, 1B1, and 1B2 and 1C1 and 1C2 are enlarged detailed views of the floating ring and stem in the positions of FIGS. 1A, 1B and 1C, respectively;

FIG. 2A is a side view of a gate valve, partly in section and partly in elevation, constructed in accordance with the second described embodiment of the invention, and showing the gate in controlled, open position and the balance stem held between the gate and the bonnet of the lower housing;

FIG. 2B is a view similar to the view of FIG. 2A, but with the gate moved to its closed position and showing the balance stem in its lower position detached from the gate and engaged with the bonnet of the lower housing;

FIG. 2C is another view similar to FIG. 2B, but with the balance stem in its raised position to engage the gate;

FIG. 2D is a graph illustrating the effect of adding the spring to a detached balance stem design upon the operation of the valve;

FIG. 3A is a side view of a valve, partly in section and partly in elevation, constructed in accordance with the third described embodiment of the invention, and also showing the gate is in its controlled open position;

FIG. 3B is a view similar to FIG. 3A, but upon failure of the controlled condition to permit the gate to be moved to its closed position, and showing the floating ring in its lower position engaged with the housing and the balance stem in raised position engaged with the gate;

FIG. 3C is a view similar to FIG. 3B, but showing the floating ring in its upper position and the balance stem in its lower position;

FIG. 3D is a view similar to FIG. 3C but showing the balance stem in its raised position engaged with the gate; and FIG. 3E is a graph showing the effect of the float ring and the spring energized detached balance stem on the operation of the valve.

With reference to the details of the above described drawings, and particularly the first embodiment thereof as shown in FIGS. 1A and 1C, the overall valve, which is designated in its entirety by reference character 10, includes a valve body 11 having a flowway 12 therethrough connected between the ends of a flow conduit, and chamber 13 which intersects the flowway. A gate 14 is vertically reciprocal within the chamber between positions opening and closing the conduit, and has a port 15 therethrough, so that when the gate is raised, as shown in FIG. 1C, a solid portion beneath the port is disposed across seats mounted in the body at each opposite end of the flowway to form continuations thereof, and, when the gate valve is lowered, as shown in FIGS. 1A and 1B, the port is aligned with the seats and thus the opposite ends of the conduit.

A stem 16 on the upper end of the gate extends sealably through and out the upper end of the actuator 17 mounted on the open upper end of the valve body cavity. More particularly, the stem extends sealably through the upper end of the actuator so that the ambient sea pressure acts over its cross sectional sealed area to urge gate to open position. The upper end of the stem also serves as a visual indicator of the position of the valve as well as a means to which an external operator may be applied.

The actuator includes a bonnet spool 18 bolted to the open upper end of the valve body, and a spool 19 mounted on the open upper end of bonnet spool 18. The bonnet spool 18 has a bore 20 through which the stem extends and a tapered shoulder 21 adapted to be engaged by a tapered shoulder 22 of the stem to locate the gate in its upper closed position of FIG. 1B. The stem shoulder of course moves downwardly away from the bonnet shoulder 21 when the gate is moved to the open position of FIG. 1A.

The portion of the stem above shoulder 22 extends sealably through a floating ring 23 carried within an annular space 24 between the bore of the lower spool and the stem. As best shown in FIG. 1A1, this ring carries inner and outer seal rings 23A and 23B which sealably slide between the stem and spool bore between a downwardly facing stop shoulder 25 on flange 26 about the stem and an upwardly facing stop shoulder 27 on the bonnet spool. In as much as it is sealably slidable between the bore and the outer diameter of the stem, the floating ring 23 separates line fluid in the valve body beneath it from the pressure in the space 24 above it in any vertical position between the stop shoulders.

The actuator also includes a cylinder 30 which is closed at its upper end by an end plate 31 bolted to the cylinder and at its lower end by a flange 32 on the upper end of the spool 19 which fits within the lower end of the cylinder. Each of the plate and flange has a central opening therethrough carrying a seal ring for sealing about the stem as it reciprocates between positions of FIGS. 1A, 1B and 1C.

More particularly, a coil spring 35 is disposed the annular space of the actuator about the stem between end flange 32 on spool 19 and a flange 36 threaded or otherwise secured to the stem. A seal ring 34 inside the flange 32 sealably engages the stem so as to form an upper pressure chamber 41 between it and a piston 37 on an intermediate portion of the stem sealably slidable within the spool 19. A lower chamber 31 is formed between the stem and the ID of the upper spool 19 beneath the piston at the upper end of annular space 24.

As can be seen from a comparison of FIGS. 1A and 1B, downward movement of the piston 37 from its FIG. 1B position to its FIG. 1A position will lower the gate from its closed to its open position and cause the spring to be compressed as the upper plate 36 moves downwardly. On the other hand, when the piston moves upwardly, it permits spring to expand to raise the stem to the position of FIG. 1B to close the gate.

A port 45 through the upper flanged end of the upper spool 19 permits control fluid from a suitable source (not shown) to be supplied to the upper pressure chamber 41 above 37 or, alternatively, to be exhausted therefrom. Another port 46 formed in the upper flange of the lower spool 18 to connect with the lower pressure chamber 31 is adapted to be connected to a source of compensation fluid, which may be seawater or an accumulator whose fluid is maintained at or around the pressure of seawater. Thus, when the control fluid is exhausted from upper chamber 41, the pressure due to compensation fluid acting on the piston 37, together with the force of the compression spring 35 and body pressure acting over the effective cross sectional diameter of the stem 16 urges the stem upwardly.

As previously described, when body pressure is relatively high, and in any case greater than that of seawater, the float ring 23 is forced upwardly to engage shoulder 25 on the stem 16 and thus, with the cross sectional diameter of the stem itself, form an effective area over which body pressure acts defined by the outer diameter of the ring, and thus with a relatively large force. On the other hand, when the ambient sea pressure is greater than that of body pressure, the ring is force downwardly against shoulder 27 in which the force due to body pressure acts only over an area defined by the outer diameter of the stem 16.

The graph of FIG. 1D illustrates how the closing pressure varies for a gate valve with the floating ring design. The dashed lines are added for comparison and indicate the closing pressure for a conventional valve with either a large diameter stem valve or small diameter stem.

In the second embodiment to the gate valve, shown in FIGS. 2A to 2C and designated in its entirety by reference character 10', the valve body and the actuator are identical in many respects to those of FIGS. 1A to 1C, and, similar parts are shown with the same numbers to which an apostrophe has been added. The valve of the second embodiment differs in that the stem 16 on the gate fits closely through the bore of a lower spool 51, which is mounted on valve body 50 and carries a seal ring 52 to seal about the stem beneath piston 37. Thus, there is no annular space between the bore of the lower spool and the stem to receive a floating ring between them, as in the first embodiment. In other respects, the upper portion of the actuator housing 17" is similar to that of the first embodiment.

As compared to the first embodiment, the lower as well as the upper end of the valve body so its open, and the actuator has a lower bonnet portion which includes a spool 52 connected to the lower open end of the valve body. The spool has a bore 54 therethrough which carries a seal ring 53 to receive a balance stem 55 for sliding therethrough between positions in which its upper end engages the lower end of the gate, as shown in FIGS. 2A and 2C, and in which it is moved downwardly out of engagement with the lower end of the gate into a limited lower position of FIG. 2B in which a flange 55A about its upper end engages a seat 55B in the spool at the upper end of its bore.

In addition, a cylindrical housing 57 is mounted on the lower end of spool 52 to contain a compression spring 58 between a plate 59 across the lower end of the cylinder and flange 60 on the balance stem, which extends downwardly and outwardly through a seal ring 60A surrounding a hole in the plate for reciprocating therein. Thus, the compression spring 58 provides a force which urges the balance stem upwardly to engage the lower end of the gate, but which is compressed as the balance stem is lowered. Thus, in the event the force from the body pressure acting on the balance stem is significantly greater than the combined forces from the ambient sea pressure acting on the balance stem 55 and the spring 58 at the time the control pressure is lost, the valve of this second embodiment of the invention operates much like a conventional gate valve that has no balance stem in that the balance stem simply moves downwardly until it shoulders out on the lower bonnet body, as shown in FIGS. 2A and 2B. However, when the force due to body pressure acting on the balance stem is less than the combined forces from ambient sea pressure and the spring 58, the balance stem is forced upwardly against the bottom of the gate, as shown in FIG. 2C.

The graph of FIG. 2D illustrates how, as compared with a standard gate valve with a detached balance stem, the spring energized detached balance stem assists in closing the valve when the force due to the body pressure acting on the balance stem drops to less than that of combined forces of ambient sea pressure acting on the balance stem 55 and the force due to the spring 58 on the balance stem. Thus, the net effect of the addition of the spring to the balance stem causes the balance stem to behave like a detached balance stem that is not spring energized which is in deeper water than what this gate valve is actually in. This effect results in the actuator providing more closing force then would otherwise be possible, as can be seen in the solid lines of the graph in FIG. 2D.

The benefit of the spring energized, detached balance stem, when used with an existing subsea actuator, is that the pressure produced by the actuator, as the valve closed, would increase significantly. This could allow this actuator to be used in deeper water due to the substantial effect of the spring on the detached balance stem. A second benefit of the spring energized detached balance stem is that the actuator spring could be made smaller for a given operating depth.

As previously described, both springs may be of such size that either can close the gate independently of the other, regardless of bore pressure, which of course would be extremely important in the event one of the springs were to break. When the actuator spring breaks in a standard actuator, the valve may stall in partially closed position when there is no low body pressure in the valve. Also, the effective ambient pressure at which the spring-energized balance stem moves out can be adjusted by changing either the spring size or the balance stem diameter.

Since the third embodiment of the valve 10" shown in FIGS. 3A to 3C is similar to both the first and second embodiments, it and its parts have similar reference characters, except for the addition of double apostrophes. More particularly, the valve body and the lower bonnet portion, including the balance stem, are shown to be identical to those of the second embodiment, and the upper portion of the body of the actuator is shown to be identical to the upper body portion shown in the first embodiment. Hence, further description of these parts of the valve 10" is unnecessary.

Referring, however, to the graph of FIG. 3E, it can be seen that the combination of the float ring with the spring-energized balance stem provide the ability of producing an even better closing pressure when there is low body pressure in the valve. More particularly, if control pressure is lost when the body pressure is relatively large, as compared to subsea pressure, the parts of the valve will move to the position shown in FIG. 3C, wherein the balance stem is moved downwardly to its lower limited position and the floating ring is moved upwardly into its upward limited position engaged with a stop on the upper stem. In this position, of course, the gate is not influenced by the balance stem, and the body pressure instead acts upwardly over the main operating stem in the manner described in connection with the first embodiment of the valve.

On the other hand, when the body pressure is relatively low and less than that of ambient pressure, the balance stem is caused to move upwardly to engage the lower end of the gate, while the float ring is force downwardly to a limited position engaged with a flange on the lower bonnet due to the ambient pressure acting above it, as shown in FIG. 3B. Thus, the effect of sea pressure is minimized.

Alternatively, when the pressure in the valve's body is greater than the ambient sea pressure and less than the body pressure necessary to push the spring energized detached balance stem outwardly, the balance stem is caused to move upwardly to engage the lower end of the gate, while the float ring is moved upwardly into its limited position engaged with the stop on the upper stem, as shown in FIGS. 3A and 3D, so that the effect of the sea pressure is reduced.

FIG. 3E also illustrates the responses of the other designs previously discussed. This and the prior graphs of FIGS. 1D and 2D do not illustrate now that actuator size can be optimized, but simply how adding the described feature to a basil design will increase the overall closing pressure.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matters herein set forth or shown in the accompanying drawings is to be interpreted as illustrative and not in a limiting sense.

What is claimed is:

1. A fail safe gate valve, comprising a valve body having a flowway therethrough and a cavity intersecting the flowway, a gate reciprocable within the cavity between positions to open and close the flowway, and an actuator for moving the gate between such positions, including a bonnet mounted on the valve body, a stem connected to one end of the gate and extending through one end of the bonnet so as to be urged by ambient pressure toward one position and by body pressure toward the other position, a piston on the stem sealably slidable within the bonnet to form a pressure chamber on one side thereof and being urged by ambient pressure on the other side toward its other position, spring means acting between the bonnet and stem to urge the gate to its other position, means by which control pressure may be supplied to said chamber in order to move the gate to and maintain it in its one position, so long as a controlled condition is maintained, or exhausted therefrom, in response to a loss of that condition, to permit the gate to be moved by said spring means to its other position, and a floating ring sealably reciprocable within an annular space between the bonnet and stem and being responsive to body pressure at one end and ambient pressure at the other end, so that it is moved between one limited position engaged with a stop on the bonnet, when body pressure is below ambient pressure, and an opposite limited position engaged with a stop on the stem when body pressure is above ambient pressure.

2. As in claim 1, wherein said one position is valve opening position, and said other position is valve closing position.

3. A fail safe gate valve, comprising a valve body having a flowway therethrough and a cavity intersecting the flowway, a gate reciprocable within the cavity between positions to open and close the flowway, and an actuator for moving the gate between such positions, including a bonnet mounted on the valve body, a stem connected to one end of the gate and extending sealably through one end of the bonnet so as to be urged by ambient pressure toward one position and by body pressure toward the other position, a piston on the stem sealably slidable within the bonnet to form a pressure chamber on one side thereof and being urged by ambient pressure on the other side toward its other position, first spring means acting between the bonnet and piston to urge the gate to its other position, means by which control pressure may be supplied to said one side of the chamber in order to move the gate to and maintain it in its one position, so long as a controlled condition is maintained, or exhausted therefrom, in response to loss of that condition, to permit the gate to be moved by said spring means to its other position, a lower bonnet on the lower open end of the valve body, a balance stem extending sealably through the lower bonnet between an inner position in which its inner end is engaged with the opposite end of the gate and a limited outer position detached from the gate and engaged with lower bonnet, and second spring means acting between the balance stem and lower bonnet to urge the balance stem toward its inner position with a force which will move the gate to its other position in the event the force due to body pressure acting on its inner end drops to less than the combined force on the stem due to ambient pressure and the first spring means.

4. As in claim 3, wherein the second spring means surrounds the balance stem and is compressed between a flange on the stem and the end of the lower bonnet.

5. As in claim 3, wherein the gate is of the slab type, and the inner end of the balance stem extends into the cavity and is sealably reciprocable within the lower bonnet, whereby body pressure entering the cavity acts on the inner end of the balance stem to urge it to its outer position.

6. As in claim 3, including a floating ring sealably reciprocable within an annular space between the bonnet and stem and being responsive to body pressure at one end and ambient pressure at the other end so that it is moved between one limited position engaged with a stop on the bonnet, when body pressure is below ambient, and an opposite limited position engaged with a stop on the stem, when body pressure is above ambient.

7. As in claim 3, wherein said one position is valve opening positions, and said other position is valve closing position.

* * * * *